June 3, 1969  H. W. HARRINGTON  3,448,380
METHOD FOR USE IN SPECTROSCOPIC ANALYSIS
Filed March 14, 1967  Sheet 1 of 4

INVENTOR
HOWARD W. HARRINGTON
BY Roland I. Griffin
ATTORNEY

INVENTOR
HOWARD W. HARRINGTON

BY Roland J. Griffin

ATTORNEY

United States Patent Office 3,448,380
Patented June 3, 1969

3,448,380
METHOD FOR USE IN SPECTROSCOPIC ANALYSIS
Howard W. Harrington, Palo Alto, Calif., assignor to Hewlett-Packard Company, Palo Alto, Calif., a corporation of California
Filed Mar. 14, 1967, Ser. No. 623,018
Int. Cl. G01r 27/04
U.S. Cl. 324—58.5                                12 Claims

ABSTRACT OF THE DISCLOSURE

A method in which electromagnetic radiation is applied to a sample to produce a selected spectroscopic transition and in which for at least two different radiation power densities in the sample the ratio of the radiation power absorbed by the sample at the transition frequency to the associated radiation field intensity in the sample or to the square root of the associated radiation power density in the sample is detected so as to obtain a new intensity coefficient at a determinable point on a curve relating this new intensity coefficient to the radiation power density in the sample.

Background of the invention

This invention relates to a method for analyzing a sample in which a spectroscopic transition may be produced by the interaction of electromagnetic radiation with the sample.

In practice pure rotational, gas-phase, microwave spectroscopy has been somewhat limited to the study of molecular properties that can be calculated from transition frequency data. The reasons for this have been the difficulty in obtaining accurate intensity data due to the phenomenon of power saturation and, more important, the inability to separate the molecular concentration, N, and the broadening time, $\tau$, of the absorbing sample from intensity data giving the net radiation power absorbed by the sample at the transition frequency. These are commonly known as the saturation and the broadening problems.

The saturation problem exists because the conventional Beer's law intensity coefficient, $\gamma$, of the transition is a function of the radiation power level in the sample. This function is given by $$\gamma = \frac{\gamma_0}{1+KP_0}$$

where $\gamma_0$ is the unsaturated intensity coefficient [see J. H. van Vleck and V. F. Weisskopf, 17 Rev. Mod. Phys., 227 (1945)], $P_0$ is the radiation power level in the sample, and $K$ is the power saturation coefficient [see Townes and Schawlow, Microwave Spectroscopy, ch. 13, pp. 371–374 (1955)]. Even at the extremely low pressures typical in the sample, $\gamma$ readily becomes a function of $P_0$ because of power saturation. This is illustrated in FIGURE 1, where the ratio $\gamma/\gamma_0$ is plotted versus $P_0$ for a transition in sulfur dioxide. The radiation power absorbed at the transition frequency is generally measured with a spectrometer in the lower power region where $\gamma/\gamma_0$ is substantially unity so that $\gamma$ is substantially independent of $P_0$ and, hence, a direct measure of $\gamma_0$. Thus, the measurement is performed under minimum-signal and consequently minimum-accuracy conditions. This is illustrated in FIGURE 1, where the ratio of the spectrometer signal amplitude, $S$, to the maximum spectrometer signal amplitude, $S_{max}$, is also plotted versus $P_0$ for a transition in sulfur dioxide (both $S$ and $S_{max}$ being measured by keeping the rectified crystal detector current of the spectrometer constant). The unsaturated intensity coefficients, $\gamma_0$, that can be accurately measured are therefore confined to a few strong absorptions.

The broadening problem exists because measurement of the net radiation power absorbed at the transition frequency gives intensity data that includes the product of the molecular concentration, N, and the broadening time, $\tau$, of the absorbing sample. Each of these quantities may vary widely. For example, the broadening time is a function of pressure, angular momentum quantum number (or rotational quantum number), dipole moment, quadrupole moment, etc., and is known to vary an order of magnitude depending on the molecular species of the sample. Moreover, the net radiation power absorbed at the transition frequency depends on the molecular concentration difference between the two states associated with the transition. This difference can be calculated only if the molecular distribution functions can be evaluated, and this can be done only for the simplest systems. Since it is virtually impossible either to predict the broadening time or to evaluate the molecular distribution functions, it is extremely difficult to interpret intensity data in terms of either the broadening time or the molecular concentration of the sample.

Both the molecular concentration, N, and the broadening time, $\tau$, would provide a better understanding of various intra- and inter-molecular effects if they could be separated from intensity data giving the net radiation absorbed by the sample at the transition frequency. For example, it is well known that low-frequency vibrations in molecules give rise to vibrational satellites. The intensities of these vibrational satellites could be measured to obtain data giving the molecular concentrations in the various vibrational energy levels. Energy-level separations of the low-frequency vibrations could be calculated from these data, and potential functions for reproducing the observed energy level separations could then be proposed to provide an understanding of the low-frequency vibrations. Since many of the energy separations of these low-frequency vibrations are below one hundred wave numbers, they cannot easily be observed directly. Thus, pure rotational spectroscopy would be an important method for examining these low-frequency vibrations if the data giving the molecular concentrations in the various vibrational energy levels could be separated from the intensity data. Other applications for molecular concentration data might be the study of gas-phase kinetic primary processes at low pressures, the observation of subtle molecular rearrangements only slightly affecting the moment of inertia, and ordinary chemical analysis. From broadening and relaxation time data, the mechanism of rotational energy transfer could be examined experimentally.

Both the saturation and the broadening problems illustrated above in the context of pure-rotational, gas-phase, microwave spectroscopy are interconnected with the conventional Beer's law intensity coefficient, $\gamma$. Moreover, it appears that no degree of sophistication in the measurement apparatus will eliminate either problem from the measurement and the interpretation of this intensity coefficient.

Summary of the invention

Accordingly, it is an object of this invention to provide a new intensity coefficient that is not interconnected with the saturation and the broadening problems.

Another object of this invention is to provide a method for analyzing a sample so as to improve the acquisition and interpretation of certain spectroscopic data already available and make possible the acquisition of additional spectroscopic data.

These objects are accomplished according to the illustrated embodiment of this invention by applying electromagnetic radiation to a sample in which a spectroscopic transition may be produced by interaction with the radiation at the transition frequency, by varying the radiation power density in the sample so as to vary the ratio of the radiation power absorbed by the sample at the transition frequency to the radiation field intensity in the sample or to the square root of the radiation power density in the sample, and by detecting this ratio for at least two different radiation power densities in the sample (at least one of these radiation power densities being in the power saturation region of the sample) so as to obtain a new intensity coefficient, $\Gamma$, at a determinable position along a curve relating $\Gamma$ to the radiation power density in the sample. This new intensity coefficient, $\Gamma$, may be factored into a term $\eta$ that is a linear function of the molecular concentration of the sample and independent of the radiation power density in the sample and the broadening or relaxation time of the sample assuming the ratio of the broadening time to the relaxation time is constant. The new intensity coefficient, $\Gamma$, may also be factored into another term $\phi$ that is a dimensionless function of the radiation power density in the sample and the broadening or relaxation time of the sample and independent of the molecular concentration of the sample. Thus, by holding $\phi$ constant $\Gamma$ is directly proportional to $\eta$ and therefore to the molecular concentration of the sample, and by holding $\eta$ constant $\Gamma$ is directly proportional to $\phi$ and therefore to the broadening or relaxation time of the sample. The molecular concentration and the broadening or relaxation time may therefore be separated from the measured intensity data even at the radiation power density associated with the maximum spectrometer signal amplitude.

When for a given transition the logarithm of $\Gamma$ is plotted along the ordinate axis versus the logarithm of $P_o$ along the abscissa axis, a universal curve is obtained provided there is no interference from other transitions. For different values of the saturation coefficient, K, this universal curve is shifted along the abscissa axis, and for different values of $\eta$ it is shifted along the ordinate axis. Thus, important spectroscopic data can be obtained by comparing the universal curves obtained for different transitions. Accordingly, the above-described method may also comprise detecting the logarithm of $\Gamma$ and the logarithm of $P_o$ (or quantities proportional thereto) and plotting one against the other in order to obtain this universal curve.

Other and incidental objects of this invention will be apparent from a reading of this specification and an inspection of the accompanying drawing.

Figure 2:
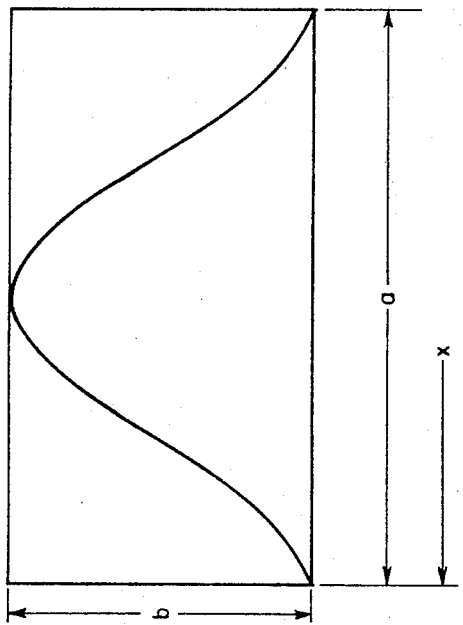
FIGURE 2 is a cross sectional view of a rectangular waveguide sample cell showing the dependence of the radiation power density upon the dimension $a$ for the dominant mode of microwave energy propagation in the rectangular waveguide.

The net rate of absorption of microwave radiation power at the transition frequency associated with a pure-rotational transition in a gas sample is given by $$\Delta P_g = \gamma L P_o \quad (1)$$

where $\Delta P_g$ is the radiation power absorbed by the gas sample at the transition frequency (or, in other terms, the absorption rate due to the gas sample), L is the radiation path length, and $P_o$ is the radiation power level in the sample. The conventional Beer's law intensity coefficient for pure-rotational spectroscopy is therefore given by $$\gamma = \frac{\Delta P_g}{L P_o} \quad (2)$$

or, as already explained above, by $$\gamma = \frac{\gamma_o}{1 + K P_o} \quad (3)$$

where the unsaturated intensity coefficient, $\gamma_o$, has units of reciprocal length and the power saturation coefficient, K, has units of reciprocal power so that the product $KP_o$ is dimensionless.

The new intensity coefficient is given by $$\Gamma = \frac{\Delta P_g}{L(P_o)^{1/2}} \quad (4)$$

where $\Delta P_g/L$ is the net radiation power absorbed per unit radiation path length and $P_o$ is the associated radiation power level in the sample. If a uniform radiation power density distribution in the sample is assumed (i.e., if $\gamma$ and $P_o$ are constant throughout the sample), combining (1), (3), and (4) and multiplying both the numerator and the denominator by $(K)^{1/2}$ yields $$\Gamma = \eta_u \phi_u \quad (5)$$

where $$\eta_u = \frac{\gamma_o}{K^{1/2}} \quad (6)$$

and $$\phi_u = \frac{(KP_o)^{1/2}}{1 + KP_o} \quad (7)$$

Since the uniform power density function $\phi_u$ contains only products of K and $P_o$, it is dimensionless. Thus, the units of the new intensity coefficient, $\Gamma$, are merely the units of $\eta_u$, that is, reciprocal length times the square root of power.

*Description of the preferred embodiment*

That $\Gamma$ can be factored as shown in (5), (6), and (7) is not peculiar to a uniform radiation power density distribution in the sample. For example, the most common sample cell is a Stark cell constructed from rectangular waveguide. In such a cell the dominant mode of radiation propagation is the so-called $TE_{10}$ mode, which has a power density distribution that is a function of position $x$ as shown in FIGURE 2. The radiation power density at $x$ is given by $$(\text{Radiation power density})_x = \frac{2P_o}{ab} \sin^2 \frac{\pi x}{a} \quad (8)$$

where $P_o$ is the total power through the cell and where, as shown in FIGURE 2, $a$ and $b$ are the cross-sectional dimensions of the cell. Thus, combining (1), (3), and (8) the net radiation power absorbed by the gas sample in the cell can be written as $$\Delta P_g = \frac{2\gamma_o P_o L}{ab} \int_0^a \frac{\sin^2 \frac{\pi x}{a}}{1 + \frac{2KP_o}{ab}\sin^2 \frac{\pi x}{a}} dx \quad (9)$$

Combining (4) and (9), integrating the right-hand side of (9), and multiplying the right-hand side of (9) by $(K/K)^{1/2}$ yields $$\Gamma = \eta_{wg}\phi_{wg} \tag{10}$$

where $$\eta_{wg} = \frac{\gamma_o}{K^{1/2}} \tag{11}$$

and $$\phi_{wg} = (KP_o)^{-1/2}[1 - (1 + KP_o)^{-1/2}] \tag{12}$$

Figure 3:
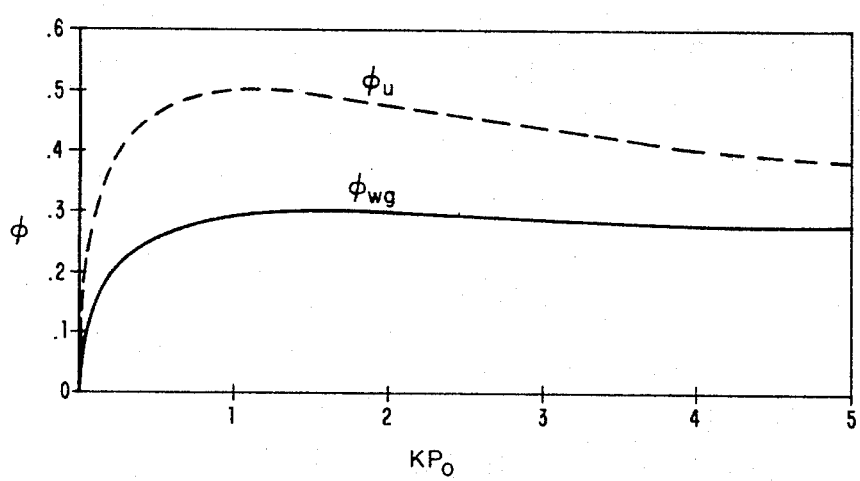
FIGURE 3 is a plot of $\phi$ versus $KP_o$ for both a uniform and a rectangular waveguide power density distribution throughout the sample.

The waveguide power density function $\eta_{wg}$ and the uniform power density function $\eta_u$ are identical. Although the waveguide power density function $\phi_{wg}$ differs in some details from the uniform power density function $\phi_u$ (for example $\phi_{wg}$ has a broader maximum), the overall properties of $\phi_{wg}$ and $\phi_u$ are substantially identical as shown in FIGURE 3. Moreover, since $\phi_{wg}$ contains only products of $KP_o$, it is dimensionless like $\phi_u$. Thus, $\Gamma$ has the same dimensions as before and appears to be generally factorable.

Considering, for example, the case of a waveguide power density distribution, the practical significance of being able to factor the new intensity coefficient, $\Gamma$, may be understood by expressing its factors $\eta_{wg}$ and $\phi_{wg}$ in terms of their molecular variables. The unsaturated intensity coefficient, $\gamma_o$, is given by the Van Vleck-Weisskopf relationship $$\gamma_o = \frac{16\pi^3}{3ck}|\mu_{ij}|^2 \frac{FN}{T}\nu_o^2 \tau \tag{13}$$

where $c$ equals the velocity of light, $k$ equals Boltzmann's constant, $|\mu_{ij}|^2$ equals the square of the dipole matrix element connecting the states $i$ and $j$, $\nu_o$ equals the frequency of the transition, $N$ equals the molecular concentration (the number of molecules per unit volume), $F$ equals the fraction of molecules in the lower of the states associated with the transition, $\tau$ equals the broadening time (the mean time between molecular collisions that broaden the absorption line), and $T$ equals the absolute temperature. The power saturation coefficient $K$ is given by Townes and Schawlow as $$K = \frac{\lambda_{wg}}{\lambda} \frac{64\pi^3 |\mu_{ij}|^2 \tau t}{3h^2 \, cab} \times 10^4 \text{ (milliwatts)}^{-1} \tag{14}$$

where $\lambda_{wg}/\lambda$ equals the ratio of the waveguide wavelength to the free space wavelength, $h$ equals Planck's constant, and $a$ and $b$ equal the cross-sectional dimensions of the rectangular waveguide cell holding the gas sample. Combining (11), (13), and (14) yields $$\eta_{wg} = \frac{\sqrt{ab\pi}}{\sqrt{3c}} \frac{\pi h}{k} \left(\frac{\lambda}{\lambda_{wg}}\right)^{1/2} |\mu_{ij}| \frac{FN\nu_o^2}{T}\left(\frac{\tau}{t}\right)^{1/2} \tag{15}$$

Inspection of (15) shows that $\eta$ is a linear function of the molecular concentration, $N$, of the sample and has a linear rather than a square dependence on the dipole moment matrix element, $|\mu_{ij}|$. Moreover, $\eta$ is independent of the radiation power level in the sample, $P_o$, and is also independent of the broadening time, $\tau$, and the relaxation time, $t$, when $\tau$ equals $t$ or when the ratio $\tau/t$ is held constant. Combining (12) and (14) demonstrates that $\phi$ is a dimensionless function of $P_o$, $\tau$, and $t$, but is independent of $N$. All of these characteristics of $\eta$ and $\phi$ have been verified by experimental results reported in a paper to be entitled On the Separation of the Broadening-Relaxation Time and Molecular Concentration From Pure-Rotational Spectroscopic Intensity Data by Howard W. Harrington and published May 15, 1967, in vol. 46, No. 10 of the Journal of Chemical Physics.

As indicated by (7) and (12), which are both plotted in FIGURE 3, $\phi$ is a function of the product $KP_o$. For a given transition and sample pressure $K$ is a constant, and $\phi$ therefore depends only on $P_o$. If the product $KP_o$ is interpreted as the number of transitions each molecule undergoes during the broadening time of the sample when the radiation power level in the sample is $P_o$, then any point along either of the $\phi$ curves of FIGURE 3 represents a fixed number of transitions per molecule for all possible broadening times. In pure-rotational spectroscopy when $\phi$ is held constant at a selected point along one of these curves, the new intensity coefficient, $\Gamma$, is directly proportional to the molecular concentration of the sample and is independent of the broadening and relaxation times of the sample because the ration $\tau/t$ is constant in pure-rotational spectroscopy. Under these conditions the amount of radiation power absorbed during the relaxation time is directly proportional to the total number of molecules absorbing the radiation power. While any point along the appropriate $\phi$ curve may be used, the point of maximum amplitude, $\phi_{max}$, is an experimentally optimum point at which to hold $\phi$ constant since $\phi_{max}$ is easy to observe and corresponds to $\Gamma_{max}$. The new intensity coefficient, $\Gamma$, is directly proportional to the spectrometer signal amplitude, $S$ (see appendix I of Harrington's above-mentioned paper). Therefore $\Gamma_{max}$ and, hence, $\phi_{max}$ are directly proportional to the maximum spectrometer signal amplitude, $S_{max}$. Thus, the new intensity coefficient, $\Gamma$, makes it possible to separate the molecular concentration of the sample from the broadening and relaxation times of the sample even at the radiation power level $P_{omax}$ associated with the maximum spectrometer signal amplitude. This eliminates both the saturation and the broadening problems as defined. The broadening or relaxation time can be calculated from the radiation power level in the sample, $P_o$, at which the molecular concentration is measured. While any point on the appropriate $\phi$ curve of FIGURE 3 may be used to calculate the power saturation coefficient, $K$, the region where the product $KP_o$ varies from 0.3 to 0.7 gives the most reliable experimental values of $K$.

Broadening and saturation problems similar to those existing in gas-phase, pure-rotational, microwave spectroscopy occur as well in other types of spectroscopy to which the above theory should also apply. However, as in spin (nuclear and electron) spectroscopy, the broadening time, $\tau$, and the relaxation time, $t$, can differ widely. In such cases the new intensity coefficient, $\Gamma$, is proportional to $N(\tau/t)^{1/2}$. Thus, by holding the ratio $\tau/t$ constant, $\Gamma$ provides a direct measure of the molecular concentration, $N$, of the sample. Conversely, by holding $N$ constant, $\Gamma$ provides a direct measure of the ratio $\tau/t$ of the sample.

The useful characteristics of the new intensity coefficient, $\Gamma$, may be further explained by comparing the following relationships for $\Gamma$ and the integrated unsaturated Beer's law intensity coefficient, $$\gamma_{int} = \int_o^\infty \gamma_o(\nu)d\nu : \Gamma : N\nu_o^2|\mu_{ij}|(\tau/t)^{1/2} \tag{16}$$

and $$\gamma_{int} : N\nu_o^2|\mu_{ij}|^2 \tag{17}$$

Although $\Gamma$ and $\gamma_{int}$ are both proportional to $N$ and $\nu_o^2$, they differ in dimension and in their dependence on $\mu_{ij}\tau$, and $t$. The new intensity coefficient $\Gamma$, is proportional to the ratio $\tau/t$ and can be used conveniently as a measure of $N$ only if the ratio $\tau/t$ is constant. This ratio is constant for rotational transitions and is generally assumed to be unity. On the other hand $\gamma_{int}$ is independent of $\tau$ and $t$. Thus, while $\gamma_{int}$ contains information about $N$, it does not contain information about $\tau/t$ as does $\Gamma$. This difference becomes important under conditions where $\tau$ does not equal $t$.

Figure 1:
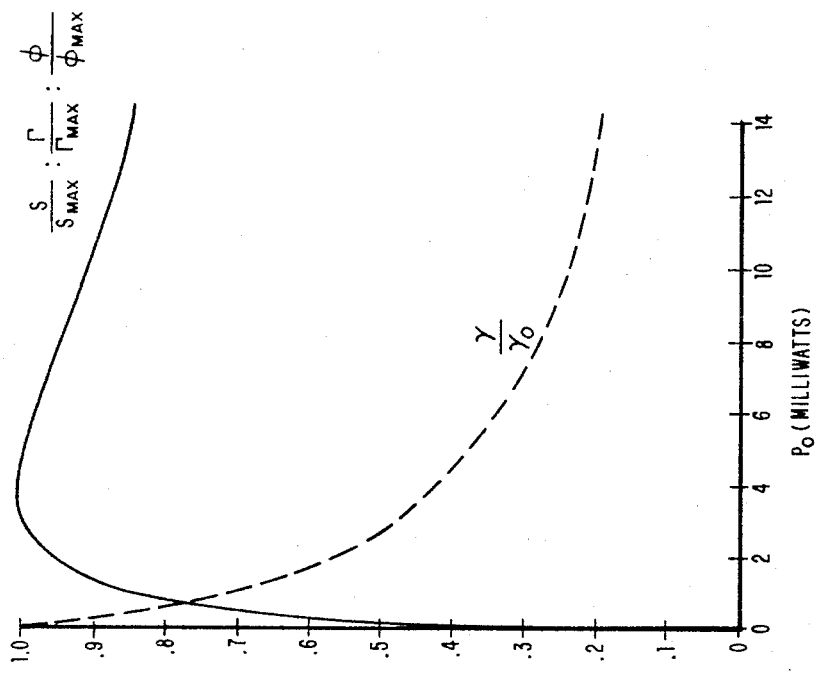
FIGURE 1, already referred to above, is a plot of the ratios $\gamma/\gamma_o$ and $S/S_{max}$ versus $P_o$ for a transition in a sulfur dioxide sample at 9403.22 mHz. and a sample pressure of twelve microns at room temperature.

The intensity coefficients $\Gamma$ and $\gamma_{int}$ also have a different dependence on $P_o$. For example, as $P_o$ approaches zero, $\Gamma$ also approaches zero. This is illustrated in FIGURE 1 by the plot of $\Gamma/\Gamma_{max}$ versus $P_o$ (since $\Gamma$ is directly proportional to the spectrometer signal amplitude, $S$, the $S/S_{max}$ curve of FIGURE 1 has the same shape as a plot of $\Gamma/\Gamma_{max}$ versus $P_o$). On the other hand keeping in mind that $\gamma_o$ can only be measured in the low power region where $\gamma/\gamma_o$ is substantially equal to unity, it may be shown by inspection of (3) that the measured values of $\gamma_o$ and therefore the determinable values of $\gamma_{int}$ approach a maximum as $P_o$ approaches zero.

The intensity coefficients $\Gamma$ and $\gamma_{int}$ also differ in other respects. For example, $\Gamma$ is proportional to the spectrometer signal amplitude even in the low power region where $\gamma/\gamma_o$ is substantially unity, whereas $\gamma_o$ and hence $\gamma_{int}$ are not proportional to the spectrometer signal amplitude. Furthermore, molecular concentration data is obtained from $\Gamma$ by using the phenomenon of power saturation usually present under common experimental conditions to adjust the net transition rate per molecule. The shape of the plot of $\Gamma$ versus $P_o$ shown in FIGURE 1 makes it possible to adjust this rate so that the product of the molecular transition rate and the broadening time is a constant (that is, the net number of transitions per molecule from the lower to the upper energy level associated with the transition is a constant for all possible broadening times). An obvious advantage therefore is that molecular concentration data may be obtained under maximum signal conditions. On the other hand molecular concentration data is obtained from $\gamma_{int}$ by operating in the low power region to avoid power saturation. The data is therefore obtained under minimum-signal and consequently minimum-accuracy conditions.

It can be shown that the relationship between the normalized $\Gamma$ line shape (the ratio of $\Gamma_{max}$ at any frequency, $v$, off-resonance to $\Gamma_{max}$ at the resonant frequency, $v_o$, of the transition) and the normalized conventional $\gamma_o$ line shape is given by $$\frac{\Gamma_{max.}(v)}{\Gamma_{max.}(v_o)} = \left(\frac{1}{Z+1}\right)^{1/2} = \left[\frac{\gamma_o(v)}{\gamma_o(v_o)}\right]^{1/2} \quad (18)$$

where $$Z = \left(\frac{v-v_o}{\Delta v}\right)^2 \quad (19)$$

Figure 4:
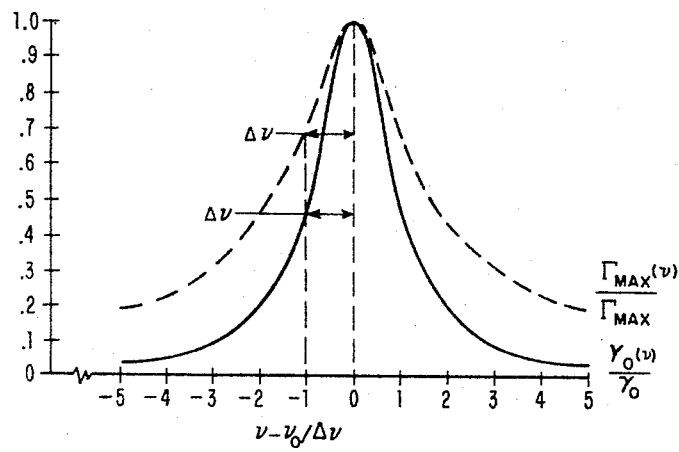
FIGURE 4 is a plot comparing the line shape associated with the new intensity coefficient, $\Gamma$, and the line shape associated with the conventional unsaturated intensity coefficient $\gamma_o$.

The frequency difference, $\Delta v$, is the conventional line width and equals $1/2\pi\tau$. Both of these line shapes are plotted versus $(Z)^{1/2}$ in FIGURE 4. In order to obtain a relationship between the broadening time, $\tau$, and either line shape of the absorption, the frequency is varied until the frequency difference, $\Delta v = 1/2\pi\tau$, is obtained. When the conventional $\gamma_o$ line shape is used, the frequency must be varied until $\gamma_o(v)$ equals $\gamma_o(v_o)/2$ to obtain this frequency difference. However, when the $\Gamma$ line shape is used, the frequency need only be varied until $\Gamma_{max}(v)$ equals $\Gamma_{max}(v_o)\sqrt{2}$ to obtain this frequency difference. This substantially smaller decrease in total available spectrometer signal amplitude together with the ability to measure $\Gamma_{max}$ at the maximum spectrometer signal amplitude means that the line width $\Delta v$ can be measured under maximum signal conditions by using the new intensity coefficient, $\Gamma$ (see FIGURE 4).

Figure 5:
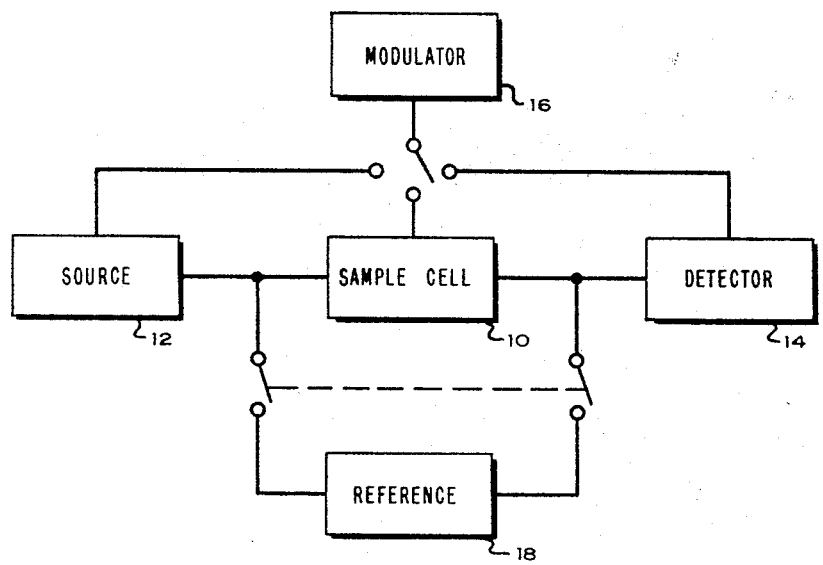
FIGURE 5 is a block diagram of apparatus that may be used in the method of this invention.

A method is now described for employing the useful properties of the new intensity coefficient, $\Gamma$, in order to improve the acquisition and interpretation of certain spectroscopic data already available and to obtain spectroscopic data not otherwise available. This method includes the step of applying electromagnetic radiation to a selected sample such as a gas in which a selected spectroscopic transition may be produced by interaction with the electromagnetic radiation at the transition frequency. As shown in FIGURE 5, the selected sample may be contained within a sample cell 10 such as a Hewlett-Packard 8425B waveguide Stark cell. A source 12 such as a Hewlett-Packard K03–8690 microwave source may be connected to the sample cell 10 to supply microwave radiation at the transition frequency to the sample.

The next step of this method comprises varying the radiation power density in the sample so as to vary the new intensity coefficient, $\Gamma$, along a curve relating $\Gamma$ to the radiation power density in the sample (see the curve of FIGURE 1 relating $\Gamma$ to $P_o$, the radiation power level in the sample, since for a sample cell of fixed dimension $P_o$ is directly proportional to the radiation power density in the sample). For a sample cell 10 of fixed dimensions this may be done by varying the amount of microwave power supplied to the sample cell by the source 12. By the step of detecting at two or more different radiation power densities in the sample the ratio of the radiation power absorbed by the sample at the transition frequency to the square root of the radiation power level in the sample, it is possible to determine $\Gamma$ at a determinable position along the curve relating $\Gamma$ to the radiation power density in the sample provided at least one of these radiation power densities is in the power saturation region of the sample. This detecting step may also comprise detecting an equivalent ratio, namely, the ratio of the radiation power absorbed by the sample at the transition frequency to the radiation electric or magnetic field intensity in the sample, in order to determine $\Gamma$ at a determinable position along this curve. A detector 14 comprising, for example, a thermistor or some other power-sensitive device for detecting the radiation power absorbed by the sample at the transition frequency and either a crystal detector for detecting the radiation field intensity in the sample or the combination of a power-sensitive device for detecting the radiation power level in the sample and a circuit for taking the square root of the detected radiation power level in the sample may be used for detecting one of these ratios.

The sensitivity of the detecting step may be increased by the additional step of time-varying the radiation power absorbed by the sample due to the transition. This may be done by coupling a modulator 16 to either the source 12, the sample cell 10, or the detector 14 so as to apply a time-varying signal thereto and produce a time variation of the radiation power absorbed by the sample due to the transition. The detecting step would then comprise detecting this time variation of the absorbed radiation power. A reference arm 18 may also be connected across the sample cell 10 for the purpose of optimizing the performance of the detector 14 independently of the radiation power level in the sample. Such apparatus for use in microwave spectrometers is described in detail in Kuhn's patent application Ser. No. 342,487 entitled Microwave Spectrometer Having Individually Adjustable Reference and Test Channels, filed on February 4, 1964, and issued as U.S. Patent No. 3,317,827 on May 2, 1967.

The above-described method may also include the step of time-varying the interaction of the applied electromagnetic radiation with the sample so as to produce a sideband field. The detecting step would then comprise detecting the radiation power of this sideband field.

Since $\Gamma$ is proportional to $FN|\mu_{ij}|v_o^2$, that is, the number of molecules in the lower of the energy levels associated with the transition, the assignment of microwave spectra is possible using the value of $\Gamma = \eta\phi$ determined by the method of this invention. For a specific molecule the line strength may be substituted for $|\mu_{ij}|$. Thus, at a fixed sample pressure relative intensity coefficients, $\Gamma$, can readily be calculated for the same point (for example, $\Gamma_{max}$) along the curve relating $\Gamma$ to $P_o$. This should be especially helpful when assignment by frequency consistency is difficult because of intramolecular effects which can cause large shifts in the frequency calculated from the rigid rotor assumption. Furthermore, the shape of $\phi$ can be useful in assigning lines which differ in intensity only because of molecular concentration. For example, vibrational satellites which have the same matrix element and the same broadening time will have the same $\phi$ function for a given energy density distribution. The temperature coefficient of both the distribution functions and the broadening time can now be examined. Equilibrium constants can be calculated from concentration data. These are but a few of the applications which arise because concentration, broadening, and relaxation data are made available by this method.

Taking the logarithm of both sides of the new intensity coefficient, $\Gamma=\eta\phi$, gives $$\log \Gamma = \log \eta + \log \phi \qquad (20)$$

Figure 6:
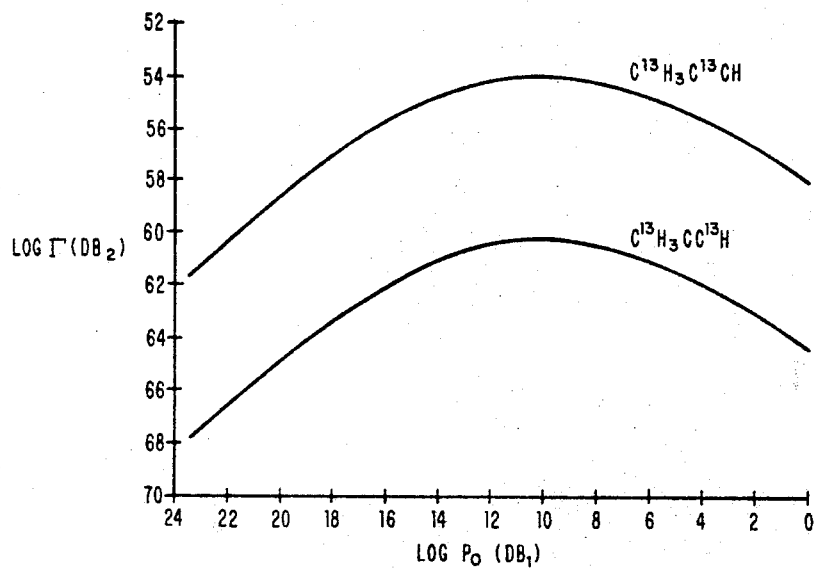
FIGURE 6 is a plot of the logarithm of $\Gamma$ expressed in decibels versus the logarithm of $P_o$ expressed in decibels for $C^{13}H_3C^{13}CH$ and $C^{13}H_3CC^{13}H$ (carbon-13 doubly substituted methyl acetylene) for the $J=1\rightarrow 2$ transition at 33,233.57 mHz. and 32,239.82 mHz., respectively.

By plotting log $\Gamma$ along the ordinate axis versus log $P_o$ along the abscissa axis for a given transition, sample pressure, and power density distribution a universal curve is obtained provided there is no interference from other transitions. Since $\phi$ is a function only of $KP_o$, this universal curve is shifted along the abscissa axis for different values of the power saturation coefficient, K. Moreover, since log $\Gamma$ is a function of log $\eta$, the universal curve is shifted along the ordinate axis for different values of $\eta$. The useful characteristic of the universal curve is that it always has the same shape. Thus, important spectroscopic data can be obtained by comparing the relative positions along the abscissa and the ordinate axes of the universal curves obtained for different transitions. This is illustrated in FIGURE 6 where the log of $\Gamma$ expressed in decibels is plotted versus the log of $P_o$ ($\phi$ varies with $P_o$ for a constant K) expressed in decibels for $C^{13}H_3C^{13}CH$ and $C^{13}H_3CC^{13}H$ (carbon-13 doubly substituted methyl acetylene) for the $J=1\rightarrow 2$ transition at 33,233.57 mHz. and 32,239.82 mHz., respectively. Inspection of FIGURE 6 shows that $C^{13}H_3C^{13}CH$ and $C^{13}H_3CC^{13}H$ have the same saturation coefficient, but that they have different values of $\eta$. By comparing the position of the universal curves of FIGURE 6 with the positions of universal curves for which K and $\eta$ are known it is possible to determine the values of K and $\eta$ for $C^{13}H_3C^{13}CH$ and $C^{13}H_3CC^{13}H$.

The universal curves of FIGURE 6 may be obtained in accordance with the above-described method by altering the detecting step. The altered detecting step comprises detecting at two or more radiation power densities in the sample the logarithm of $\Gamma$ or some other quantity proportional thereto (such as the radiation field change, $\Delta E$, in the sample at the transition frequency) and detecting the logarithm of $\phi$ or a variable thereof (such as $KP_o$, $P_o$ for a constant K, or K for a constant $P_o$). From these data it is possible to determine the position of the universal curve along the ordinate and abscissa axes.

Figure 7:
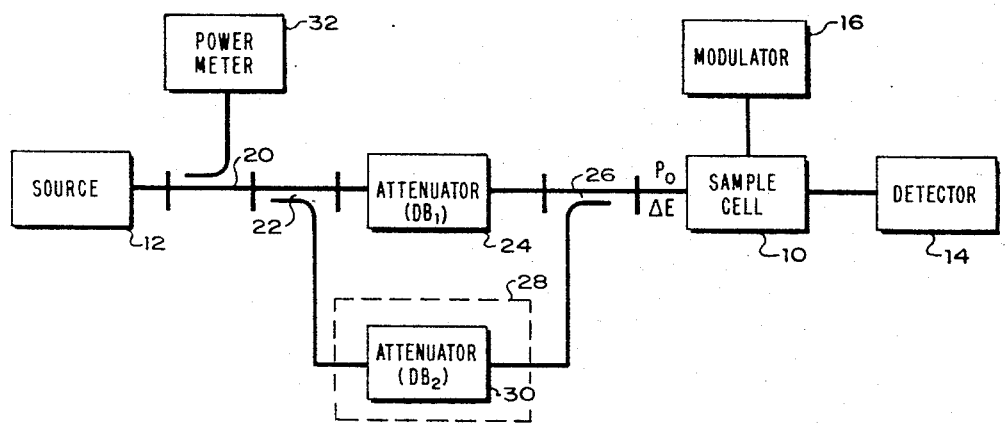
FIGURE 7 is a block diagram of apparatus that may be used to obtain the data plotted in FIGURE 6.

As shown in FIGURE 7, the altered detecting step may be performed in microwave spectroscopy by employing a microwave bridge to connect a microwave source 12 to a Stark-modulated sample cell 10. The bridge includes a main arm for coupling microwave radiation from the source 12 to the sample cell 10 to interact with the sample at the transition frequency. This main arm comprises the primary lines of directional couplers 20 and 22, an attenuator 24 calibrated in decibels, and the primary line of directional coupler 26. The bridge also includes a calibration arm 28 for producing a microwave signal that may be adjusted to cancel out the modulation effect of the Stark-modulated sample cell 10. An absolute indication of the intensity coefficient of the transition in the sample cell 10 is therefore provided when the calibration arm 28 is adjusted to maintain the level of microwave power applied to the detector 14 substantially constant. This calibration arm 28 may be constructed as shown in detail in Kuhn's above-mentioned patent application. It includes the auxiliary line of directional coupler 22, an attenuator 30 calibrated in decibels, and the auxiliary line of directional coupler 26. A power meter 32 may be connected to the auxiliary line of directional coupler 20 for indicating the level of microwave radiation power applied to the parallel main and calibration arms of the bridge.

The microwave power into the sample cell 10 is designated as $P_o'$ when the reading $DB_1$ of attenuator 24 is zero and simply as $P_o$ when $DB_1$ is anything else. Similarly, the electric field change due to the calibration arm 28 is designated as $\Delta E'$ when the reading $DB_2$ of attenuator 30 is zero and as $\Delta E$ when $DB_2$ is anything else. For a set of experiments at the same or different frequencies $P_o'$ and $\Delta E'$ can be made constant. Therefore, as the power density in the sample cell 10 is varied, it is possible to detect the logarithm of $\Delta E$ in decibels by the reading $DB_2$ of attenuator 30 and to detect the logarithm of $P_o$ in decibels by the reading $DB_1$ of attenuator 24. Since $\Delta E$ is proportional to $\Gamma$ and since $P_o$ is a variable of $\phi$, the universal curves of FIGURE 6 may be obtained by plotting the logarithm of $\Delta E$ in decibels ($DB_2$) along the ordinate axis versus the logarithm of $P_o$ in decibels ($DB_1$) along the abscissa axis.

I claim:
1. A method for analyzing a sample of matter in which a spectroscopic transition may be produced by the interaction of electromagnetic radiation with the sample, said method comprising the steps of:
   applying electromagnetic radiation at the transition frequency to the sample to be analyzed, said radiation interacting with the sample to produce the transition at which some of the radiation power is absorbed by the sample;
   varying the radiation power density in the sample so as to vary the ratio of the radiation power absorbed by the sample at the transition frequency to the square root of the radiation power density in the sample, said ratio varying along a curve relating this ratio to the radiation power density in the sample; and
   detecting the radiation power absorbed by the sample at the transition frequency for at least two known radiation power densities in the sample so as to determine this ratio at a determinable position along this curve.

2. A method as in claim 1 wherein said detecting step comprises detecting the ratio of the radiation power absorbed by the sample at the transition frequency to the square root of the radiation power level in the sample for at least two different radiation power densities in the sample so as to obtain spectroscopic transition data at a determinable position along this curve, at least one of said radiation power densities in the sample being in the power saturation region of the sample.

3. A method as in claim 1 wherein said detecting step comprises detecting for at least two different radiation power densities in the sample the radiation power absorbed by the sample at the transition frequency and the square root of the radiation power level in the sample so as to determine at a determinable position along this curve the ratio of the radiation power absorbed by the sample at the transition frequency to the square root of the radiation power level in the sample, at least one of said radiation power densities being in the power saturation region of the sample.

4. A method as in claim 1 wherein the ratio of the broadening time of the sample to the relaxation time of the sample is held constant so that the ratio of the radiation power absorbed by the sample at the transition frequency to the square root of the radiation power density in the sample is a linear function of the molecular concentration of the sample and is independent of the broadening and the relaxation times of the sample.

5. A method as in claim 4 wherein the ratio of the broadening time to the relaxation time is unity.

6. A method as in claim 1 wherein the molecular concentration of the sample is held constant so that the ratio of the radiation power absorbed by the sample at the transition frequency to the square root of the radiation power density in the sample is a direct function of the ratio of the broadening time of the sample to the relaxation time of the sample and is independent of the molecular concentration of the sample.

7. A method as in claim 1:
   including the additional step of time-varying the radiation power absorbed by the sample at the transition; and
   wherein said detecting step comprises detecting the time variation of the radiation power absorbed by the sample at the transition frequency for at least two known radiation power densities, at least one of said radiation power densities being in the power saturation region of the sample.

8. A method as in claim 1:
including the additional step of time-varying the interaction of the electromagnetic radiation with the sample to produce a sideband field; and
wherein said detecting step comprises detecting the amplitude of this sideband field for at least two known radiation power densities in the sample, at least one of said radiation power densities being in the power saturation region of the sample.

9. A method as in claim 1 wherein:
said curve relating the radiation power density in the sample and the ratio of the radiation power absorbed by the sample at the transition frequency to the square root of the radiation power density in the sample has a maximum; and
said detecting step includes detecting this ratio substantially at the maximum of this curve.

10. A method as in claim 1 including the additional step of plotting the logarithm of one of said ratio and a quantity proportionally related to said ratio versus the logarithm of one of the radiation power density in the sample and a quantity dependent thereon to obtain a universal curve from which spectroscopic transition data may be learned.

11. A method for analyzing a sample of matter in which a spectroscopic transition may be produced by the interaction of electromagnetic radiation with the sample, said method comprising the steps of:
applying electromagnetic radiation at the transition frequency to the sample to be analyzed, said radiation interacting with the sample to produce the transition at which some of the radiation power is absorbed by the sample thereby causing a corresponding change in each field component of the electromagnetic radiation interacting with the sample;
varying the radiation power density in the sample to vary at least one of the radiation field change in the sample at the transition frequency and a quantity proportionally related thereto; and
detecting for at least two different radiation power densities in the sample both the logarithm of said one of the radiation field change in the sample at the transition frequency and the quantity proportionally related thereto and the logarithm of one of the radiation power density in the sample and a quantity dependent thereon to obtain data related by a universal curve.

12. A method as in claim 11 wherein said detecting step includes:
detecting the logarithm of the ratio of the radiation power absorbed by the sample at the transition frequency to the square root of the radiation power density in the sample at the transition frequency; and
detecting the logarithm of the power density in the sample at the transition frequency.

References Cited
UNITED STATES PATENTS 2,637,767    5/1953    Hershberger _____ 324—58.5
2,792,548    5/1957    Hershberger _____ 324—58.5

RUDOLPH V. ROLINEC, *Primary Examiner.*

P. F. WILLE, *Assistant Examiner.*

UNITED STATES PATENT OFFICE
CERTIFICATE OF CORRECTION

Patent No. 3,448,380 June 3, 1969

Howard W. Harrington

It is certified that error appears in the above identified patent and that said Letters Patent are hereby corrected as shown below:

Column 4, line 52, cancel "Description of the preferred embodiment" and insert the same as a heading between lines 2 and 3, same column 4. Column 6, line 28, after "defined" insert -- above --. Column 7, line 50, "$\Gamma_{max}(\upsilon_o)\sqrt{2}$" should read -- $\Gamma_{max}(\upsilon_o)/\sqrt{2}$ --.

Signed and sealed this 21st day of April 1970.

(SEAL)
Attest:

Edward M. Fletcher, Jr.

Attesting Officer

WILLIAM E. SCHUYLER, JR.

Commissioner of Patents